United States Patent [19]

Percel et al.

[11] Patent Number: 4,511,584

[45] Date of Patent: Apr. 16, 1985

[54] PARTICULATE FOOD ACIDULANT

[75] Inventors: Phillip J. Percel, Parma; Douglas W. Perkins, Medina, both of Ohio

[73] Assignee: SCM Corporation, New York, N.Y.

[21] Appl. No.: 499,353

[22] Filed: May 31, 1983

[51] Int. Cl.³ ............................................ A23L 1/221
[52] U.S. Cl. .................................... 426/99; 426/650; 426/652
[58] Field of Search ................ 426/99, 272, 285, 303, 426/646, 650, 652, 453, 471, 96

[56] References Cited

U.S. PATENT DOCUMENTS 2,681,287  6/1954  Starr ................................. 426/652 X
2,992,116  7/1961  Sair .
3,359,120  12/1967  Meusel et al. .
3,793,465  2/1974  Bohren .
4,220,668  9/1980  Wistreich et al. .................. 426/266
4,279,935  7/1981  Kentor ............................ 426/646 X

FOREIGN PATENT DOCUMENTS 1138765  1/1969  United Kingdom .

Primary Examiner—Arthur L. Corbin
Attorney, Agent, or Firm—Richard H. Thomas

[57] ABSTRACT

A particulate food acidulant composed of lactic acid plated onto a calcium lactate carrier, and a lipid coating encapsulating the carrier and acid.

11 Claims, No Drawings

PARTICULATE FOOD ACIDULANT

TECHNICAL FIELD

This invention pertains to a particulate food acidulant and, more specifically, to a lactic acid acidulant on a calcium lactate carrier encapsulated by a hard, edible lipid. The invention also pertains to a method for making the food acidulant of this invention. Finally, the invention pertains to a method for treating food wherein the coating of the acidulant prevents release of acid that may degrade the food before complete dispersion is accomplished. The present invention is particularly useful in the acidulation of meat products.

BACKGROUND ART

Acidulation of food masses has been accomplished by various means. One method, of long standing, was to inoculate the food mass with a small proportion of previously-fermented food mass. The resulting inoculated food mass was allowed to ferment for an extended period of time. Fermentation by this method was gradual due to the time needed for bacteria to grow and produce acid, usually lactic acid.

Another method for acidulating a food mass was for food acids to be added directly to the food. In food masses of meat or meat products, especially comminuted meat products, localized high concentrations of acid from the particulate acidulant must be avoided. These high acid concentrations or so-called "hot spots" can deleteriously affect the appearance and/or taste of the meat being processed and eventually the finished goods also. The handling characteristics of the meat mass are also changed to that of such a hardness that it is no longer easy to stuff the comminuted meat into casings if this is desired. Also, a meat emulsion can "short out" or "grease out" whereby emulsified fat escapes from its usually high proteinaceous coating if the protein fiber is degraded before it has been hardened by smoking.

To avoid degradation of the food mass from localized high concentrations of such acid, dispersion (throughout the food mass) had to be quickly accomplished. A variation of this approach was to add a substance such as glucono delta lactone, which required further reaction with the food mass before acid developed. Most commonly such an acidulant reacted with water present in the food and hydrolyzed into acid. This is shown in U.S. Pat. No. 2,992,116 (Louis Sair) and British Pat. No. 1,138,765, published Jan. 1, 1969. However, the dispersion still had to be relatively quick to avoid problems with concentrations of acid produced from undispersed concentrations of acid-producing substances.

Finally, some acidulants have been encapsulated with a layer of an edible lipid or wax, such as disclosed in Meusel et al U.S. Pat. No. 3,359,120. The layer of fat, by reducing or totally preventing until later the contact of the acidulant with the food mass, allowed a longer period for dispersion of the particulates. Bohren U.S. Pat. No. 3,793,465 disclosed an acid compound with controlled release, for acidifying milk, comprising an acid such as citric or lactic, on a solid carrier such as glucose, sucrose or protein, coated with an edible fat. Westreich et al U.S. Pat. No. 4,220,668 also is of interest, disclosing soaking of meat products in a solution of lactic acid, with or without other acids.

The use of lactic acid for acidulating meat products, over other acids, is preferred because it produces the same texture, preservation and tangy flavor obtained with natural fermentation, using a bacterial starter culture. However, lactic acid is normally in a liquid state and its use for meat acidulation has been accompanied with substantial difficulties. In the Westreich et al process, it was necessary to use for the meat emulsion mixture a casing which was permeable to acids, severely limiting the flexibility of the process.

Lactic acid in crystalline form is very deliquescent and when exposed to atmosphere quickly liquifies. It has thus been impossible to use crystalline lactic acid for meat acidulation.

A principal problem experienced with plating lactic acid onto a carrier has been obtaining a sufficient concentration of lactic acid for effective acidulation, taking into consideration the fact that the carrier, whatever water is present, and coating fat are diluents in the meat acidulation process. In addition, the carrier has to have a proper surface area to volume (low surface area) to obtain an effective fat coating, i.e., minimal leach of acid, without an excessive amount of coating. In the Bohren patent the only ratios given for a lactic acid/carrier/lipid product is in Example 3, wherein the product comprises about 22.5% lactic acid, 25% glucose, and 50% lipid.

With less than 25% acid, so large an amount of the plated, coated product would be needed for the acidulation of meat process (e.g., about four pounds of product to get one pound of acid) as to render the process less than cost effective.

In addition to the carriers proposed in the Bohren patent, namely glucose, sucrose or protein, it has also been proposed to use such carriers as sodium silicoaluminate and microcrystalline cellulose (Avicel PH-101, marketed by FMC Corporation). These are known anti-caking agents of fine particle size (high surface area to volume ratio) and capable of absorbing a fair amount of lactic acid. However, it was found that they could not be effectively fat coated, even with the use of an excessive amount of fat, possibly because of the particle size and possibly because of an irregular particle shape.

Advantages of the instant acidulant and process using the same are that a high concentration of lactic acid dispersed in the food mass being acidulated can be obtained, while at the same time effective protection against localized high acid concentrations, or so-called "hot spots" in meat products, can also be obtained. The reason for this is that the calcium lactate was found to be a particularly suitable carrier. Not only is it capable of absorbing more lactic acid, e.g., 100% plus (as anhydrous) based on its own weight, than most other carriers, but in addition, the plated calcium lactate can be effectively coated with a lipid wherein the lipid is less than 45% by weight of the final coated product. By "effectively coated" it is meant that the coating is sufficiently continuous to reduce the leach rate of the acid to that necessary to assure against the development of the so-called "hot spots". The present invention also means that a high acid concentration throughout the meat product can be obtained with the use of a minimum weight of acidulant.

DISCLOSURE OF INVENTION

The present invention resides in a particulate food acidulant comprising lactic acid plated onto particulate calcium lactate carrier in the weight ratio of at least about 50% lactic acid (as anhydrous) to 50% carrier*, and a water insoluble hard, edible, lipid coating at least substantially encapsulating said carrier and acid in an amount effective to prevent substantial release of acid from said acidulant before said lipid coating melts.

*These proportions include bound water present in the calcium lactate powder, which is marketed as a pentahydrate, but not free water which remains following spray application of the lactic acid.

Preferably, the lactic acid is applied to the particulate calcium lactate by spraying onto a fluid bed of the calcium lactate a lactic acid solution of at least about 80% concentration, the conditions of application being such as to reduce the moisture content to less than about 13% (based on the weight of acid). The plated carrier preferably has a particle size distribution such that at least about 80% is retained on U.S. Standard Sieve screens in the range of 20-70 mesh, inclusive. Following application, the plated carrier is coated with lipid, the interim time between application of the acid and lipid coating being sufficiently short to prevent material absorption of water by the lactic acid. The amount of lipid applied is that necessary to obtain a leach profile of less than 50% lactic acid in 15 minutes and less than 80% lactic acid in 30 minutes, as determined by a leach test herein described.

The weight proportions of ingredients of the acidulant of the present invention preferably are about 40-45% calcium lactate* to about 55-60% lactic acid (as anhydrous), the lipid content based on the weight of finished product being in the range of about 40-45%. Preferably, the lipid is a triglyceride fat having a Capillary Melting Point of about 100°-150° F.

*These proportions include bound water present in the calcium lactate powder, which is marketed as a pentahydrate, but not free water which remains following spray application of the lactic fluid.

Although not to be bound in any theory, it is believed that the calcium lactate commercially available has a particle size distribution or high surface area to weight ratio that permits it to absorb a large amount of lactic acid, but in addition, sufficient water solubility so that in the lactic acid application, onto a fluid bed of the carrier, there is substantial agglomeration of the carrier to provide a particle size distribution suitable for lipid coating. It is probable that the conditions of the fluid bed, which cause some flashing off of water and substantial particle-to-particle contact are especially suitable for the agglomeration which takes place.

The present invention also resides in a process for treating a food mass comprising dispersing substantially uniformly into said food mass the particulate food acidulant herein in a proportion sufficient for obtaining a preselected pH level when said lactic has been released as acid into said food mass; the temperature of said food mass during admixture being not above $T_1$; any release of said acid from said acidulant being insufficient to degrade the food mass before the lipid coating melts; and elevating the temperature of said food mass containing dispersed acidulant to a value of $T_2$, $T_2$ being above or at the temperature at which the lipid coating melts.

BEST MODE FOR CARRYING OUT THE INVENTION AND INDUSTRIAL APPLICABILITY

The lactic acid to be plated onto a carrier is commercially available. It may be that which is developed from a bacterial culture, such as described in the Westreich et al U.S. Pat. No. 4,220,668. This disclosure of U.S. Pat. No. 4,220,668 is incorporated herein by reference. Alternatively, it may be synthetically prepared. One suitable such acid is "Natural Lactic Acid 88% FCC" marketed by Pettibone World Trade. Similar products are marketed by Fallek Chemical and Monsanto. The strength of the lactic acid is not critical (it is available in 80% and 88% concentration), as moisture is removed during the spray application step, applying the acid to a carrier, although clearly use of a higher strength acid reduces the drying load in the spray application step. For this reason, use of acid of 88% concentration is preferred. Following spray application to the carrier, the lactic acid preferably should not contain more than about 13% water by weight. The presence of more than about 13% water unduly dilutes the acidulant of this invention.

The lactic acid preferably is applied to the calcium lactate by spray applying the acid into a fluidized bed of the calcium lactate. Although there are many fluidized bed apparatus which can be used, one suitable such apparatus is a spray fluid bed applicator marketed by Glatt Air Techniques, Inc., Model GPCG. A similar type unit is sold by Aeromatic, Inc. of Bernardsville, N.J. The Glatt unit and technique for using it are described in copending application Ser. No. 337,722, filed Jan. 7, 1982 and assigned to assignee of the present application, now abandoned. The disclosure of Ser. No. 337,722 is incorporated herein by reference.

In essence, the apparatus comprises a fluidized bed chamber, which is generally cylindrical in shape, but which is provided with an expansion zone at the top to limit the elevation of the bed in the chamber. The bottom of the bed is maintained by an air distribution plate extending horizontally across the chamber, near the bottom of the chamber.

An inlet is provided at the bottom of the chamber for introducing a fluidizing medium into the chamber. A second inlet may be provided at the side of the chamber, above the air distribution plate, for introducing the calcium lactate carrier into the chamber. Above the normal level of the bed, there is provided a spray nozzle for spraying lactic acid onto the calcium lactate carrier, which is maintained in a fluidized condition in the bed by the fluidizing medium.

In operation, the fluidized bed is operated on a semi-continuous batch cycle basis by the introduction of a predetermined amount of calcium lactate carrier into the bed, establishment of the bed, application of the lactic acid spray onto the carrier material, and then withdrawal of the finished product.

Alternatively, the lactic acid can be spray applied to the calcium lactate using an apparatus such as a ribbon blender, one suitable such ribbon blender being marketed by Lee Industries, Inc.

Another alternative type apparatus that can be used is a simple mixer such as a Hobart mixer, although, again, a fluidized bed apparatus is preferred.

It is a feature of the present invention that immediately following application of the calcium lactate to the carrier, the lipid or fat coating is applied, using the same fluid bed, the same nozzle, but different bed and application conditions. This has the advantage that the process is semi-continuous, saving on start-up and shut-down time, and also that absorption of water by the lactic acid, which is hygroscopic, is prevented.

In practice, the application of fat or lipid to the plated carrier can take place as soon as the bed is allowed to come to a new temperature equilibrium desired for the lipid coating. Normally, this is only a matter of a few minutes.

In this regard, the following are typical processing conditions for spraying lactic acid and lipid coating material in the Glatt apparatus: Model GPCG-5.

An example of a fluid nozzle employed with the Glatt Model GPCG-5 is a 2-fluid nozzle manufactured by Schlick Manufacturing, having a 1.2 mm. part for the fluid and an annular air cap.

TABLE 1

| | |
|---|---|
| Atomization Air Pressure: | 3.5–4.0 bar |
| Inlet Air Temperature: | 56–60° C. for spraying Lactic Acid |
| | 46–48° C. for spraying coating material |
| Solution Flow Rate: | 80 ml./min. for Lactic Acid |
| | 45 ml./min. for coating material |
| Outlet Air Temperature: | 46–56° C. for spraying Lactic Acid |
| | 44–46° C. for coating material |
| Atomization Air Temperature: | Ambient for Lactic Acid |
| | 95–99° C. for coating material |

The loading of carrier in the fluid bed chamber is dependent to a degree upon the ratio of lactic acid to carrier desired, a lower loading giving a higher ratio, generally speaking. By way of example, the loading in a 5 kg. fluid bed unit may be about 2½ kg. of calcium lactate carrier for a product (uncoated) which is about 50% lactic acid and slightly less for preparation of a product which is about 60% lactic acid.

Application of lactic acid in the fluid bed apparatus is carried out until the desired concentration of lactic acid on the carrier is reached or when the load of lactic acid on the carrier is at maximum limit.

Lactic acid is generally available, as mentioned, in two concentrations, 80% and 88%. In either instance, the temperature of the fluidizing medium or inlet air is high enough to flash off some water, more in the case of the use of 80% acid. Regardless, it is desirable, as previously mentioned, to obtain a product in which there is less than 13% water (based on acid weight).

With the use of 88% acid, processing conditions as described in Table 1 and immediate fat coating, a product is obtained in which the water content is a few percent less than 13% (based on acid weight).

The calcium lactate powder which is used as the carrier in the present invention is calcium lactate pentahydrate, commercially available in very fine particle size. One suitable such powder is Calcium Lactate USP Powder, TAC-4208 marketed by Mallinkrodt Food Products. The specifications for this product call for zero percent retained on a U.S. 30 mesh screen and eight percent maximum on a 100 mesh screen (U.S. Standard Sieve). Another suitable such powder is one marketed by Pettibone World Trade. The particle size distribution is similar to that of the Mallinkrodt product. The specifications for this product call for 100% passing through a 40 mesh screen (U.S. Standard Sieve). In the practice of the present invention, these two products were used interchangeably.

The particle size of the carrier and plated product (following application of the lactic acid to the calcium lactate) are critical. The lactic acid does not materially increase volume of the product, but in the spray application process, under the conditions of application, the water in the lactic acid is believed to solubilize some of the calcium lactate causing in turn some agglomeration. This is probably due to the agitation in the bed and particle-to-particle impact which occurs, and in addition to the use of a fluidizing temperature 56°–60° C. which results in some flashing off water. Possibly in the solubilizing, impact and particle drying that occurs, weak particle-to-particle bridges are formed sufficient to achieve the desired agglomeration. It was found, in accordance with the present invention, that under the conditions of the bed, the particle size distribution increased such that about 80% of the plated material was retained on mesh screens from 20–70 mesh, inclusive, and that this was sufficiently course that the product could be effectively lipid coated without use of an excessive amount of lipid.

A typical particle size distribution of carrier and lactic acid is as follows:

| Mesh screen size | Approx. amount retained (weight percentage) |
|---|---|
| 10 | 0.18 |
| 20 | 41.28 |
| 40 | 46.20 |
| 60 | 6.56 |
| 80 | 2.22 |
| pan | 3.56 |

The product composition was 40% calcium lactate and 60% lactic acid (not anhydrous) applied from an 88% solution.

The process for applying lipid to the plated lactic acid and carrier is preferably by spraying molten edible lipid onto the plated carrier in the same fluid bed chamber as soon as the bed comes to the equilibrium conditions desired.

Useful lipid types include mono- and diglycerides and other hydrophilic lipids such as fatty acids, fatty emulsifiers, edible soaps (e.g., zinc stearate), and fatty alcohols; and waxes such as beeswax or paraffin or a mixture of same. Suitably, these are of edible quality for culinary or cosmetic purposes and capable of being performed (sufficiently hard) into small particles which remain substantially discrete from each other and readily pourable as ostensible solids at room temperature, 75° F. (23.9° C.), from a conventional 100-milliliter beaker which has been filled loosely at such temperature with such particles in uncompressed bulk condition.

Preferably, however, for efficiency and economy, the lipid will be all or substantially all a triglyceride, particularly a hydrogenated vegetable oil such as hydrogenated cottonseed, corn, peanut, soybean, palm, palm kernel, babassu, sunflower and/or safflower oils. Also, various animal fats can be used in their hydrogenated or unhydrogenated states. The fats can be derived from animals such as hogs, cattle, poultry, and sheep, and it can include lard, oleo stock, olestearine, and tallow.

A preferred lipid is a hard fat such as a stearine, having a CMP (Capillary Melting Point) in the range of about 100°–150° F. One suitable stearine is Durkee 27 (trademark, SCM Corp.), a partially hydrogenated palm oil, marketed in bead form, and having an IV of 5 max., a CMP of 136°–143° F., and a free fatty acid content of 0.10% max. Such coating lipids can be mixtures, and also include in their compositions small amounts of dispersing aids such as edible soaps, lecithin, hydroxylated lecithin, alkoxylated and plain glycol esters of edible fatty acids, ethyoxylated or plain sorbitol or sorbitan esters of fatty acids, or food emulsifiers in salt form such as sodium or calcium stearyl lactylic acid. The coatings can also have scentings and flavorings.

The spraying conditions for applying the coating material are dependent on the material used. It should be applied from a molten condition, using atomizing air at a temperature sufficiently high to maintain the molten state of the fat particles up to impact with carrier and lactic acid. With the use of stearine having a CMP in the range of about 136°-143° F., it was found that an atomizing air temperature of 95°-99° C. (see Table 1), or 203°-211° F., produced optimum results. With a lower melting fat, the atomizing air temperature would be correspondingly less, and with a higher melting fat, correspondingly higher.

The inlet and outlet air temperatures are adjusted to permit solidification of the coating and prevent aggregation of the discrete coated particles. Here also specific temperatures employed depend upon the fat used. The temperatures of Table 1 (inlet—46°-48° C. or 114°-118° F.; outlet—44°-46° C. or 111°-114° F.) are representative. For fats of higher or lower CMP's (than 136°-143° F.), the inlet and outlet temperatures should be made correspondingly higher or lower.

Using a particle size range as described above for the substrate (carrier and lactic acid), and the above conditions of application, it was found that an effective leach rate (less than 50% lactic acid in 15 minutes and less than 80% lactic acid in 30 minutes) could be obtained with a fat coat weight of less than about 45% of the finished product (preferably about 40-45%).

The procedure for determining leach rate involves placing one gram of sample (fat coated calcium lactate and lactic acid) into 50 ml. of water and placing the same in a 250 ml. Erlenmeyer flask. The flask is then clamped onto a Burrell Shaker (wrist action), Model 75, and agitated at a speed setting of 5 for a predetermined length of time (e.g. 15 min., 30 min.).

Following agitation, the suspension is filtered, using a glass wool filter, to stop any further leach, and the clear solution is titrated with potassium hydroxide to determine acid content.

The proportion of the particulate food acidulant used in the food mass can vary somewhat from food to food. Generally, it is equivalent to what will produce about 1-6 ounces of lactic acid per 100 pounds of food mass to be processed. In general, the particular food acidulants are added after most of the mechanical processing steps used to prepare the food mass have been completed. This precaution is taken to minimize any acid release due to the physical destruction of the lipid layer. If some mechanical stress to the lipid layer is unavoidable due to the nature of the food processing steps, the lipid layer thickness should be increased.

This means that the percentage of lipid in the particulate acidulant would be higher. Generally, however, the preferred portions again are about 40-45% lipid and 55-60% plaqued carrier, to avoid undue acid dilution in the food mass. Release of the acid plaqued on the carrier agent is accomplished through heating of the food mass. The heating should go above the melting point of the lipid to release the acid. Additionally, the particle size of the food acidulant after the lipid layer has been added should not be above about 10 U.S.S. mesh in size for most solid or semi-solid foods. This is to facilitate dispersion in the food masses, but is especially critical in the acidulation of meat to avoid the formation of hot spots. Particles sized more than 10 mesh release too much acid in one area. Smaller particles are more easily dispersed through the food mass. Where the food mass is totally fluid, such as milk, the particle size can be much larger. However, the particle size must not be so large as to cause the particles to rapidly sink after addition. There should be little retention of particles on a 10 U.S.S. mesh.

The following examples are illustrative of the present invention:

EXAMPLE 1

In this example, 88% food grade lactic acid was spray applied to particulate calcium lactate following the above-described procedure. The calcium lactate was of fine particle size having at least zero retention on a 30 mesh screen. The conditions of application were those set forth in Table 1 using the Glatt unit GPCG-5. The end product was a fine, free-flowing white powder having a lactic acid content (not anhydrous) of about 59% and a calcium lactate content of about 41%. The water content was not determined, but it is believed that some water was flashed off in the process. It was less than 13% based on acid content.

Immediately following spray application, the product was lipid coated using Durkee 27 (Stearine) (trademark SCM Corp.), here also using the procedure and conditions of Table 1. The amount applied was 42% based on the weight of the finished product. The coating step took place quickly after application of the lactic acid, the interim time being only that sufficient to allow the bed to come to a new temperature equilibrium required for the coating step. The particle size distribution of the finished product was as follows:

| Mesh Size | Particle Finished Product % Retained |
|---|---|
| 10 | 0.0 |
| 20 | 24.02 |
| 40 | 56.88 |
| 60 | 17.82 |
| 80 | 0.86 |
| Pan | 0.42 |

Leach profile data for the finished product was as follows:

| Leach Profile Minutes | % Released |
|---|---|
| 5 | 9.9 |
| 15 | 42.8 |
| 30 | 74.9 |
| 60 | 98.7 |

In this Example, the leach profile date was well within parameters established to avoid localized "hot spots" in meat processing.

EXAMPLE 2

This Example is another illustration of a fat coated lactate/lactic acid product within the scope broadly of the present invention. The finished product had the following composition:

| Product Composition | |
|---|---|
| Ingredient | Percent |
| Lactic/Calcium Lactate | 55.0 |
| Maltodextrin | 5.0 |
| 27 Stearine | 40.0 |

The moisture content was less than 13% based on lactic acid weight. In this example, the lactic acid was plated onto the calcium lactate, but then drum packed prior to fat coating. In the interim handling, fines were generated and the malto dextrine (aqueous solution) was sprayed into a fluid bed of the calcium lactate, using a GPCG-500 unit, to reduce the amount of fines. Conditions of spraying were about 3 bar atomization pressure, 60° C. and 40°–45° C. inlet and outlet air temperatures, and a spray rate of about 1000 ml./min. The substrate prior to fine reduction, had the following particle size distribution:

| Particle Size of Substrate | |
|---|---|
| Mesh Size | % Retained |
| 10 | 0.18 |
| 20 | 40.10 |
| 40 | 23.65 |
| 60 | 14.93 |
| 80 | 10.85 |
| Pan | 10.29 |

Following fat coating (using the conditions of Example 1), measurement of the leach profile for the fat coated finished product showed it to be within criteria for avoiding "hot spots", as follows:

| Leach Profile | |
|---|---|
| Minutes | % Released |
| 5 | 4.7 |
| 15 | 10.1 |
| 30 | 16.9 |
| 60 | 25.9 |

Despite carefully controlled conditions, too much agglomeration of substrate occurred when the malto dextrine was sprayed into the fluid bed of substrate, and sieving to 10 mesh or finer resulted in about a 10% loss. (The leach profile data was obtained on the sample remaining after sieving).

This Example is illustrative of the importance of fat coating the substrate in the same bed quickly following lactic acid plating. Even though calcium lactate is a substrate which is easily agglomerated, such agglomeration can cause the formation of particles in excess of 10 mesh and significant loss.

Lactic acid plated onto calcium lactate is now a commercially available product marketed by Pettibone World Trade as "Powdered Lactic Acid 60%" said to contain 59–61% lactic acid and 37–39% calcium lactate. The powder following shipping would have excessive fines.

EXAMPLE 3

This Example employed silicon dioxide as a substrate, for purposes of comparison. The same processing parameters and apparatus of Examples 1 and 2 were utilized. The following is particle size, leach and product composition data for the finished product:

| Particle Size Finished Product | | Leach Profile | | Product Composition | |
|---|---|---|---|---|---|
| Mesh Size | % Retained | Minutes | % Released | Ingredients | Percent |
| 20 | 2.2 | 5 | 90.8 | Lactic Acid | 31.5 |
| 40 | 4.2 | 15 | 92.8 | Silicon Dioxide | 18.5 |
| 60 | 40.6 | 30 | 98.0 | 27 Stearine | 50.0 |
| 80 | 38.6 | | | | |
| 120 | 14.0 | | | | |
| Pan | 0.4 | | | | |

Comparing the data of this Example with Example 2, it is evident that the particle size is significantly smaller, and that even with more fat (50%), much poorer leach results were obtained.

One advantage of the use of silicon dioxide is its ability to retain a large amount of lactic acid. However, no agglomeration of it was successfully carried out, which is one reason why it is a good free-flow agent. The result is that it could not be successfully coated with lipid. No test conducted using silicon dioxide as a substrate achieved near the leach profile results of Examples 1 or 2.

EXAMPLE 4

In this Example, the substrate was microcrystalline cellulose. The same procedures and parameters of Examples 1 and 2 were employed. The following is comparative leach and product composition data for the finished product.

| Leach Profile | | Product Composition | |
|---|---|---|---|
| Minutes | % Released | Ingredient | Percent |
| 5 | 70.9 | Lactic Acid | 30.0 |
| 15 | 73.5 | Microcrystalline Cellulose | 20.0 |
| 30 | 74.3 | 27 Stearine | 50.0 |

The particle size distribution of the microcrystalline cellulose was that of the commercially available product, and it gave good absorption of lactic acid (60% based on weight of substrate and lactic acid). As with the substrate of Example 3, no successful agglomeration of the substrate was achieved. At a fine particle size distribution, even with the application of lipid in the amount of 50% based on finished product weight, the leach profile data was dramatically poorer than that for Examples 1 and 2.

EXAMPLE 5

This Example is illustrative of the present agglomeration which takes place during the plating step using calcium lactate as a substrate or carrier. In this example, calcium lactate having a particle size distribution such that there was no retention on a 30 mesh screen was used. The conditions for applying lactic acid of Table 1 were employed using the Glatt fluid bed unit, Model GPCG-5.

The following is particle size and product composition data for the plated lactate:

| Particle Size | | Product Composition | |
|---|---|---|---|
| Mesh Size | % Retained | Ingredient | Percent |
| 10 | 0.18 | Calcium Lactate | 40.0 |
| 20 | 41.28 | Lactic Acid | 60.0 |
| 40 | 46.20 | | |
| 60 | 6.56 | | |
| 80 | 2.22 | | |
| Pan | 3.56 | | |

In all of the above Examples, the product composition data ignored free water content, which was included in the percent lactic acid values given. Thus, the percents lactic acid as anhydrous would be a few percents less than those given, for instance, about 4–8% in Example 1 and 5 (based on acid content).

EXAMPLE 6

The following ingredients were used to make a summer sausage, fermented meat product. The list of ingredients followed by the number of parts by weight used were:

| Lean beef | 75 |
|---|---|
| Beef trimmings | 25 |
| Salt | 4 |
| Dextrose | 1 |
| Ground mustard | 1 |
| Durkote encapsulated lactic acid** | 2 |
| Ground black pepper | .25 |
| Whole black or white pepper | .06 |
| Mustard seed | .06 |
| Sodium erythorbate | .05 |
| Sodium nitrite | .02 |

**Footnote: Durkee encapsulated lactic acid prepared by the procedure of Example 1.

The lean beef as treated in a meat grinder with a plate hole opening size of ⅛ inch diameter. The beef trimmings were treated in the same fashion, only the plate opening hole size was increased to ½ inch diameter. The ground beef was then mixed with the rest of the ingredients.

The mixture was stuffed into casings at an internal meat temperature of approximately 50° F. The resulting sausage was smoked until an internal temperature of the meat reached 137° F. This was accomplished by raising the temperature of the smokehouse slowly over a five-hour period. The meat was held at 137° F. for 15 to 30 minutes to complete the heat release phase. The internal meat temperature was then lowered to between 110°–120° F. and held for 9–10 hours during smoking. Then the internal meat temperature was raised to 139° F. and held for one hour. The final processing step included showering the sausage with water, chilling it, vacuum packing it and finally refrigerating it. The sausage using encapsulated lactic acid displayed the following pH history: 0 hours, 6.0; 5 hours, 5.6; 24 hours, 5.0; 48 hours, 4.9. A control product employing lactic acid starter culture displayed the following pH history: 0 hours, 6.0; 5 hours, 5.7; 24 hours, 5.2; 48 hours, 4.9.

We claim:

1. A particulate food acidulant consisting essentially of lactic acid plated onto particulate calcium lactate carrier in a weight ratio of lactic acid (as anhydrous) to carrier of about 1:1 to about 3:2, and a water insoluble hard, edible, lipid coating substantially encapsulating said carrier and acid in an amount effective to prevent substantial release of acid from said acidulant before said lipid coating melts.

2. The particulate food acidulant of claim 1 having a leach profile of less than 50% lactic acid in 15 minutes and less than 80% lactic acid in 30 minutes.

3. The particulate food acidulant of claim 2 wherein the plating is obtained by the process of spraying lactic acid of at least about 80% concentration onto a fluid bed of said carrier, the food acidulant having a particle size less than 10 mesh, U.S. Standard Sieve.

4. The particulate food acidulant of claim 3 wherein the lipid coating is obtained by the process of applying to a fluid bed of carrier and lactic acid a coating of the lipid immediately following the plating of said acid onto said carrier.

5. The particulate food acidulant of claim 4 wherein the calcium lactate plated with lactic acid has a particle size distribution such that at least about 80% is retained on U.S. Standard Sieve screens in the range of 20–70 mesh, inclusive.

6. The particulate food acidulant of claim 2 wherein the moisture content of the calcium lactate plated with lactic acid is less than about 13%, based on the weight of acid.

7. The particulate food acidulant of claim 6 comprising lactic acid and calcium lactate in a weight ratio of lactic acid (as anhydrous) to calcium lactate of about 11:9 to about 3:2, the lipid content being about 40–45% based on the weight of the finished product.

8. The acidulant of any of claims 1, 2, 3, 4, 5, 6 or 7 wherein said lipid is a triglyceride having a capillary melting point in the range of about 100° F. to 150° F.

9. A particulate food acidulant for meat acidulation consisting essentially of:

lactic acid plated onto particulate calcium lactate carrier in a weight ratio of lactic acid (anhydrous) to carrier of about 1:1 to about 3:2; and a water insoluble hard, edible, lipid coating substantially encapsulating said carrier and acid in an amount in the range of 40–45% based on the weight of the finished product;

the calcium lactate plated with lactic acid having a moisture content of less than 13%, based on the weight of acid, and the acidulant having a leach profile of less than 50% lactic acid in 15 minutes and less than 80% lactic acid in 30 minutes, and a particle size less than 10 mesh, U.S. Standard Sieve.

10. The acidulant of claim 9 prepared by spray applying the lactic acid and lipid coating in sequence onto a fluid bed of the calcium lactate, the lactic acid plated calcium lactate, prior to lipid coating, having a particle size such that at least about 80% is retained on U.S. Standard Sieve mesh screens in the range of 20–70 mesh, inclusive.

11. The acidulant of claims 9 or 10 wherein said lipid is a triglyceride fat having a capillary melting point in the range of about 100° F.–150° F.

* * * * *